United States Patent
Chen et al.

(10) Patent No.: US 9,210,117 B2
(45) Date of Patent: Dec. 8, 2015

(54) INVITATION INFORMATION PUSH METHOD AND SYSTEM

(71) Applicant: TENCENT TECHNOLOGY (SHENZHEN) COMPANY LIMITED, Shenzhen (CN)

(72) Inventors: Yuewei Chen, Shenzhen (CN); Huanyu Zhou, Shenzhen (CN); Ming Tian, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 247 days.

(21) Appl. No.: 13/762,528

(22) Filed: Feb. 8, 2013

(65) Prior Publication Data

US 2013/0151643 A1 Jun. 13, 2013

Related U.S. Application Data

(63) Continuation of application No. PCT/CN2011/077995, filed on Aug. 4, 2011.

(30) Foreign Application Priority Data

Aug. 25, 2010 (CN) .......................... 2010 1 0265937

(51) Int. Cl.
| | |
|---|---|
| G06F 15/16 | (2006.01) |
| H04L 12/58 | (2006.01) |
| H04L 29/08 | (2006.01) |
| H04L 29/06 | (2006.01) |

(52) U.S. Cl.
CPC ................ *H04L 51/32* (2013.01); *H04L 51/12* (2013.01); *H04L 67/16* (2013.01); *H04L 67/26* (2013.01); *H04L 65/403* (2013.01)

(58) Field of Classification Search
CPC ....... H04L 51/32; H04L 51/12; H04L 65/403; H04L 67/16; H04L 67/26
USPC ................... 709/206, 204, 203, 224; 715/753
See application file for complete search history.

(56) References Cited

U.S. PATENT DOCUMENTS

| | | | |
|---|---|---|---|
| 2003/0140103 A1* | 7/2003 | Szeto et al. .................... | 709/206 |
| 2006/0133335 A1* | 6/2006 | Garcia-Martin ............. | 370/338 |
| 2007/0026883 A1* | 2/2007 | Sung et al. .................... | 455/518 |
| 2007/0156815 A1* | 7/2007 | Mate et al. .................... | 709/204 |
| 2007/0208809 A1* | 9/2007 | Westman ....................... | 709/205 |
| 2008/0307511 A1* | 12/2008 | Ahtisaari ......................... | 726/4 |
| 2010/0162412 A1 | 6/2010 | Muraki | |

FOREIGN PATENT DOCUMENTS

| | | |
|---|---|---|
| CN | 101001151 A | 7/2007 |
| CN | 101764818 A | 6/2010 |
| CN | 101808081 A | 8/2010 |

OTHER PUBLICATIONS

International Search Report for International Patent Application No. PCT/CN2011/077995, dated Nov. 10, 2011, and English translation thereof.

* cited by examiner

*Primary Examiner* — Jungwon Chang
(74) *Attorney, Agent, or Firm* — Harness, Dickey & Pierce, P.L.C.

(57) ABSTRACT

An invitation information push method includes after receiving an invitation request sent by a microblog user, a server sending invitation information to a number of clients corresponding to invited users carried in the invitation request, wherein the invited users are users who have not registered microblog, and the number of the invited users N is greater than or equal to 1. Each client, upon receiving the invitation information, creating an invitation information guide to guide the users who have not registered the microblog to register the microblog. The method further comprises, when a predetermined time is reached, a server actively sending invitation information to at least one client corresponding to at least one user who has not registered the microblog.

11 Claims, 4 Drawing Sheets

INVITATION INFORMATION PUSH METHOD AND SYSTEM

CROSS-REFERENCE TO RELATED APPLICATIONS

This application is a continuation of International Patent Application No. PCT/CN2011/077995 filed on Aug. 4, 2011. This application claims the benefit and priority of Chinese Patent Application No. 201010265937.3, filed Aug. 25, 2010. The entire disclosures of each of the above applications are incorporated herein by reference.

FIELD

The present disclosure relates to internet technology and to an invitation information push method and system.

BACKGROUND

This section provides background information related to the present disclosure which is not necessarily prior art.

Microblog, which is the abbreviation of the miniature blog, is an information sharing, propagation, and acquisition platform based on user relation. The microblog is similar to the blog, but the microblog can publish instant messages. Through the cluster approach, each microblog user can form their own audience. The microblog user can publish personal views and opinions to their own audience through microblog text, and use the most refined words and phrases to express the most advanced opinions.

At present, having users sign up for microblog, increasing the number of new user account registrations, and influencing the microblog are problems that each microblog service provider has to consider. In order to solve this problem, one ideal way is to push invitation information to clients of those users who have not registered the microblog. However, no information push method for microblogs presently exists.

SUMMARY

This section provides a general summary of the disclosure, and is not a comprehensive disclosure of its full scope or all of its features.

Various embodiments provide an invitation information push method and a system to realize pushing of microblog invitation information, and to guide users who have not registered the microblog to conveniently register the microblog.

An invitation information push method includes after receiving an invitation request sent by a microblog user, a server sends invitation information to clients corresponding to a number of invited users carried in the invitation request, wherein the invited users are users who have not registered microblog, and the number of the invited users N is greater than or equal to 1. Upon receiving the invitation information, each client creating an invitation information guide to guide the user who has not registered microblog to register microblog.

An invitation information push system includes a server is configured to, after receiving an invitation request sent by a microblog user, send invitation information to clients corresponding to a number of invited users carried in the invitation request, wherein the invited users are users who have not registered microblog, and the number of the invited users N is greater than or equal to 1. A client is configured to, upon receiving the invitation information, create an invitation information guide to guide the users who have not registered microblog to register microblog.

An invitation information push method includes sending, by a server when a predetermined time is reached, invitation information to at least one client corresponding to at least one user who has not registered microblog. Receiving the invitation information by the at least one client corresponding to the at least one user who has not registered microblog. Creating, by each of the at least one client, an invitation information guide to guide the at least one user who has not registered microblog to register microblog.

As can be seen from the above, in various embodiments, the push of the invitation information is controlled by the server and this can realize guiding users who have not registered the microblog to register the microblog. This is completely different from the existing technology solution in which a user actively logs onto a microblog site to register a microblog account. Various embodiments can provide convenience for the registration of microblog, and can also improve the registration amount and the influence of the microblog.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

To better explain the objectives, characteristics, and advantages, various embodiments will be described in detail with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
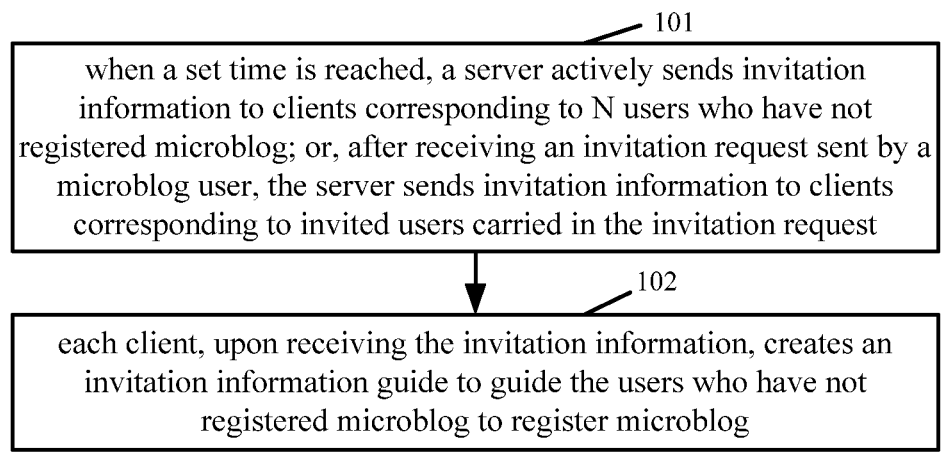
FIG. 1 is a flow chart of an invitation information push method of various embodiments.

A method provided in various embodiments mainly includes the process shown in FIG. 1:

At 101: when a predetermined time is reached, a server actively sends invitation information to clients corresponding to N users who have not registered the microblog; or, after receiving an invitation request sent by a microblog user, the server sends invitation information to clients corresponding to invited users carried in the invitation request.

N is a positive integer which is greater than or equal to 1. Further, the invited users carried in the invitation request are users who have not registered the microblog, and the number of the invited users is greater than or equal to 1. It should be noted, in actual implementation, the clients at 101 can be a mobile client, a PC client, a web portal, etc., and the specific form of a client is not limited by various embodiments.

At 102: each client, after receiving the invitation information, creates an invitation information guide to guide the users who have not registered the microblog to register the microblog.

The invitation information guide at 102 can be an invitation information interface, and can also be an invitation information text box and so on, and various embodiments do not specifically limit the form of the invitation information guide. For ease of description, the following text gives the invitation information interface as the description of an example of the invitation information guide.

In FIG. 1, the server plays a central role in which the server can deliver the invitation information to the clients corresponding to the invited users according to the invitation request, and the server can also actively initiate a push of the invitation information to implement background operation function. Various embodiments differ from the existing technical solution in which a user actively logs on to a microblog site to register the microblog and provide convenience for the registration of microblog as well as improve the registration amount and the influence of the microblog.

The method provided in various embodiments is hereinafter described in detail.

Figure 2:
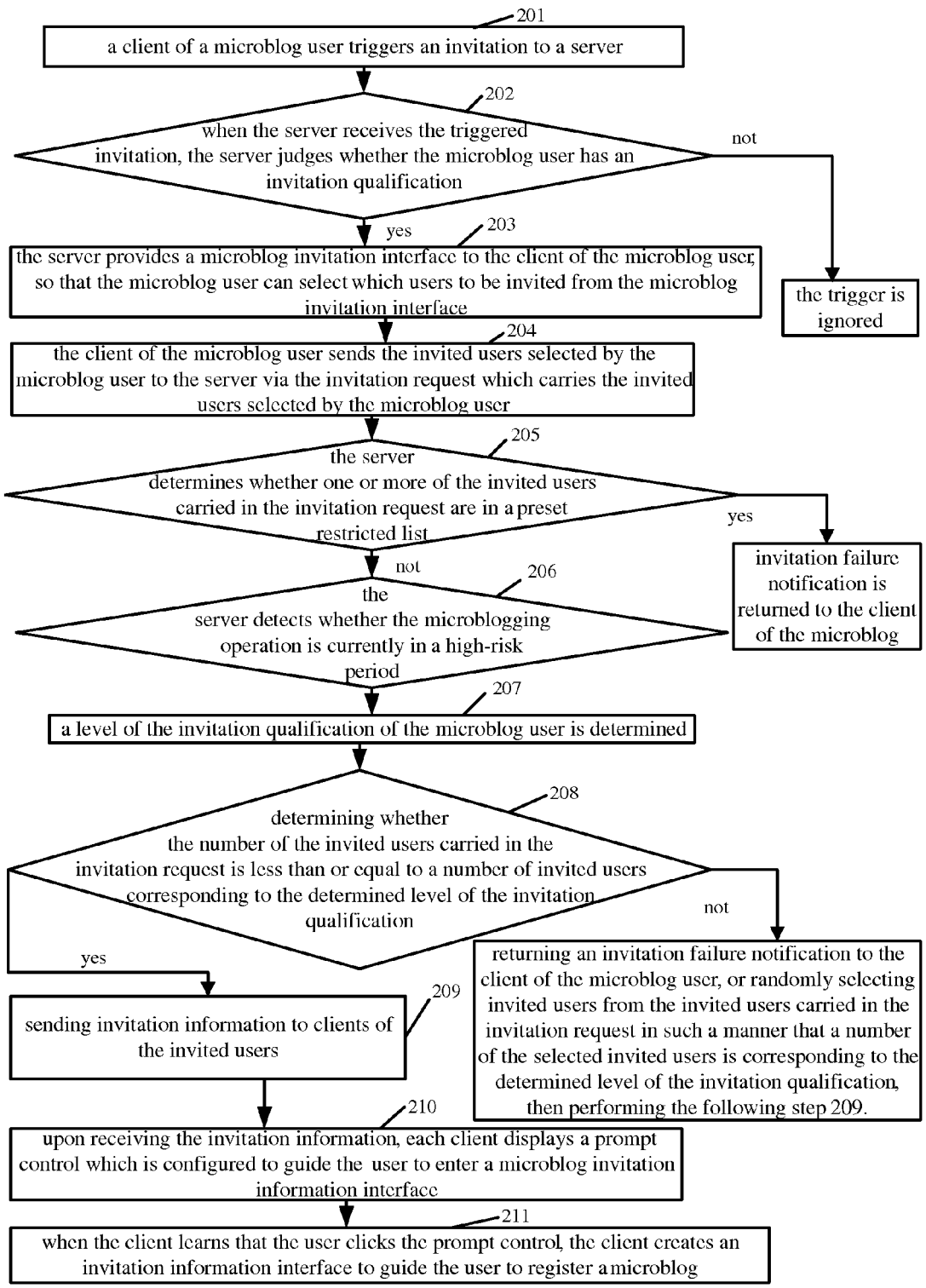
FIG. 2 is a flow chart of an invitation information push method of various embodiments.

In various embodiments, a server pushes invitation information according to an invitation request initiated by a microblog user. Further details will be explained in reference to the process shown in FIG. 2. FIG. 2 is a flow chart of various embodiments. As shown in FIG. 2, the process can include following:

At 201: a client of a microblog user triggers an invitation to a server.

At 201, the client of the microblog user specifically can be a mobile client, a PC client, a web portal or other clients, which have a microblog invitation entry, e.g., a button or a link, and 201 can be realized by triggering the invitation entry.

At 202: when the server receives the triggered invitation, the server judges whether the microblog user has an invitation qualification, if yes, then performs 203; otherwise, ignores this triggered invitation.

The invitation qualification can be generated by the server according to various indicators such as activeness of the microblog user. For example, a microblog user may be determined as having the invitation qualification if his or her microblog registration time exceeds a predetermined time, or the number of published microblogs reaches a predetermined number. Various embodiments can also use other means to determine the invitation qualifications of the microblog user, and it is not specifically limited here.

Preferably, this embodiment can also ignore 202. Block 202 is performed mainly to control the invitation entry of the client of each microblog user to prevent abuse of the invitation.

At 203: the server provides a microblog invitation interface to the client of the microblog user, so that the microblog user can select which users to be invited from the microblog invitation interface.

The microblog invitation interface can contain a classification of users who have not registered the microblog, thus, the microblog user can select N users who have not registered the microblog from the classification of users who have not registered the microblog as the invited users.

At 204: the client of the microblog user sends the invited users selected by the microblog user to the server via the invitation request which carries the invited users selected by the microblog user.

The invited users can be represented with corresponding instant communication identifiers.

At 205: the server determines whether one or more of the invited users carried in the invitation request are in a preset restricted list; if yes, returns an invitation failure notification to the client of the microblog user; otherwise, performs 206.

At 206: the server detects whether the microblogging operation is currently in a high-risk period; if yes, returns an invitation failure notification to the client of the microblog user; otherwise, performs 207.

There is no fixed time sequence between 205 and 206, and 206 can also be performed first. For example, detecting whether the microblogging operation is currently in a high-risk period may be performed first, when it is detected that the microblogging operation is currently in a high-risk period, returning the invitation failure notification to the client of the microblog user, otherwise, performing 205; but when a determining result of 205 is a no, 207 needs to be performed.

At 207: determining a level of the invitation qualification of the microblog user.

At 208: determining whether the number of the invited users carried in the invitation request is less than or equal to a number of invited users corresponding to the determined level of the invitation qualification. If yes, performing 209, otherwise, returning the invitation failure notification to the client of the microblog user, or randomly selecting a number of users from the invited users carried in the invitation request in such a manner that the number of the selected invited users corresponds to the determined level of the invitation qualification, then performing 209.

The invitation qualifications of various embodiments can be divided according to levels, and different levels of the invitation qualifications can invite different numbers of users. There is a certain corresponding relation between the level of the invitation qualification and the number of invited users. Based on this, 208 can be according to the corresponding relation between the level of the invitation qualification and the number of invited users, determining whether the number of the invited users carried in the invitation request is less than or equal to the number of invited users corresponding to the determined level of the invitation qualification.

With respect to the level of the invitation qualification, it can also be determined according to various indicators such as activeness of the microblog user. For example, it can be determined according to the number of microblogs published by the microblog user, the microblog registration time of the microblog user, and so on, which is not specifically limited here.

The invitation requests are filtered through 205 to 208. In various embodiments, the following filtering method can also be added: filtering invitation requests sent from clients of microblog users who meet a preset type, for example, filtering invitation requests sent from wireless terminals. This can ensure effective control of subsequent invitation information.

At 209: sending invitation information to clients of the invited users.

In various embodiments, the invitation information can include the following type of information in actual implementation:

(1): invitation only, that is, an invitation command is directly used as the only content of the invitation information;

(2): besides invitation command, the invitation information can also include hot user, hot information and so on, that is, on the basis of the invitation command, hot user, hot information, persons whom the invited users may know and so on, can be added to form an abundant invitation information;

(3): on the basis of the point (2), different abundant invitation information may be pushed to clients of different invited users.

It can be seen that at 205 to 209, in nature, are operations that the server transfers the invitation request sent by the microblog user.

At 210: upon receiving the invitation information, each client displays a prompt control which is configured to guide the user to enter a microblog invitation information interface.

In various embodiments, the prompt control can be disposed at a prominent position of a main panel.

At 211: when the client learns that the user clicks the prompt control, the client creates an invitation information interface to guide the user to register the microblog.

Preferably, if the invitation information is abundant invitation information such as type (2) or type (3) information mentioned above at 208, then 211 can further include: displaying content contained in the invitation information.

At this point, the process provided in various embodiments is realized.

At 208, sending of the invitation information can be flexibly controlled by the server, and scope of the control includes: <1> control of sending timing of the invitation information: the invitation information is controlled to be transferred to the invited users immediately or with a time delay; <2> control of types of clients which receive the invitation information: types of clients to which the invitation information is sent are controlled, for example, some invitation information is only transferred to PC clients and is not transferred to wireless terminals or web ends; <3> other extended controls: since the server has the control power, it can add other control strategies according to needs, and various embodiments will not be limited.

Various embodiments can support a plurality of microblogs clients to initiate invitation requests, and meanwhile, can also support a plurality of receiving ends to receive invitation information transferred by the server.

Figure 3:
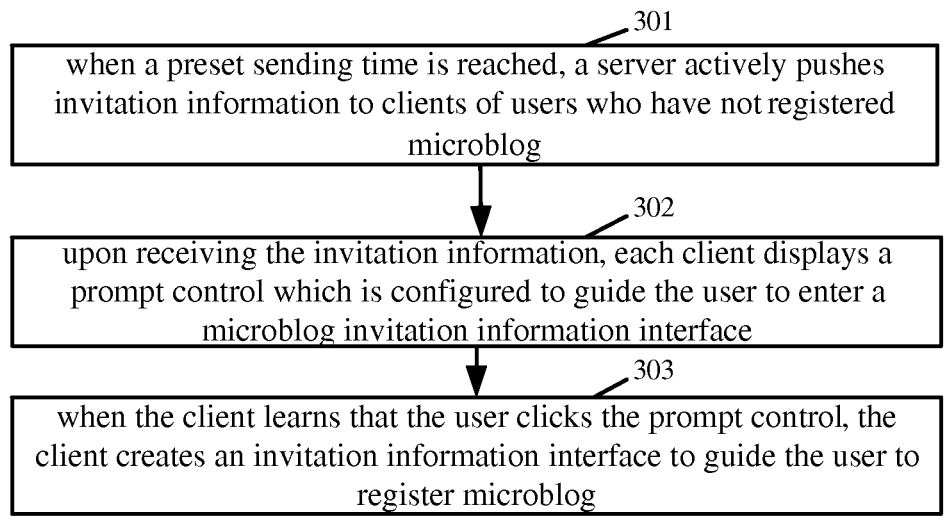
FIG. 3 is a flow chart of an invitation information push method of various embodiments.

In various embodiments, since the number of users who actively initiate an invitation request is limited, in order to further improve the registration amount and the influence of the microblog, this embodiment provides a method which is different from embodiment one, i.e., a server actively pushes invitation information to play background operation function, which specifically refers to the process shown in FIG. 3.

Referring to FIG. 3, FIG. 3 is a flow chart of an invitation information push method of various embodiments. As shown in FIG. 3, the process can include the following steps:

At 301, when a preset sending time is reached, a server actively pushes invitation information to clients corresponding to N users who have not registered the microblog.

At 301, the time can be specifically set according to the actual situations, and various embodiments are not specifically limiting.

The clients at 301 can include the following types of clients: <1> clients of users who have not registered the microblog in a network segment; <2> clients of some users who have not registered the microblog and have identifiers on some instant communication applications such as Tencent QQ, Skype, iMessage or Yahoo! Messenger; <3> clients of friends of some microblog users (the friends are determined according to instant communication relation chains of the microblog users, and these friends have not registered microblog); <4> clients of a certain number of randomly selected users who have not registered the microblog.

At 302 and 303 are similar to 210 and 211, and they will not be repeated here.

In various embodiments, the server can send the invitation information to clients of a plurality of users who have not registered the microblog.

At this point, the process provided in embodiment two is realized.

The method provided in various embodiments has been described above, and a system provided in various embodiments is described below.

Figure 4:
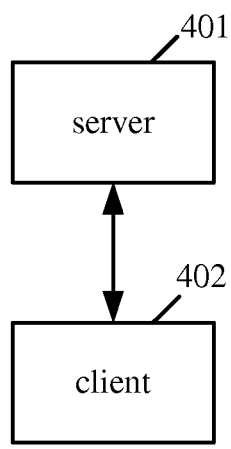
FIG. 4 is a system diagram of various embodiments.

A system provided in various embodiments mainly includes a server and clients, specifically shown in FIG. 4.

The server 401 is configured to, when a set time is reached, actively send invitation information to clients corresponding to N users who have not registered the microblog. N is a positive integer which is greater than or equal to 1.

Alternatively, after receiving an invitation request sent by a microblog user, send the invitation information to clients corresponding to invited users carried in the invitation request. The invited users are users who have not registered the microblog, and the number of the invited users is greater than or equal to 1;

Each client 402 is configured to, upon receiving the invitation information, create an invitation information guide to guide the users who have not registered the microblog to register the microblog.

The system provided in various embodiments is hereinafter described in detail.

Figure 5:
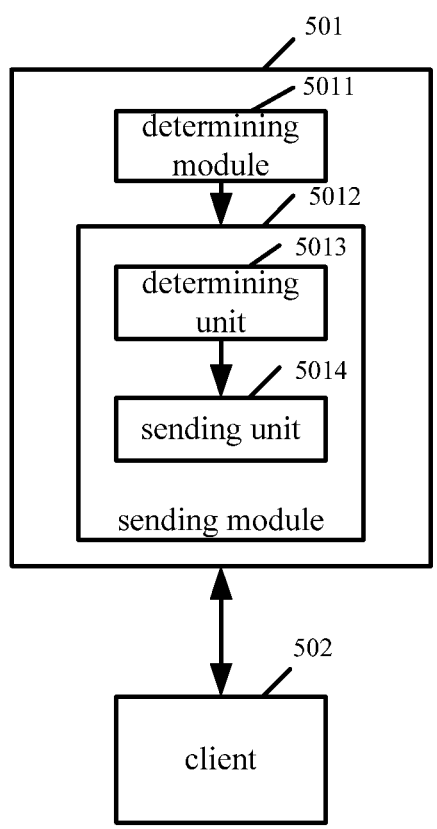
FIG. 5 is a system diagram of various embodiments.

FIG. 5 is a detailed system diagram of various embodiments. As shown in FIG. 5, the system merely includes a server 501 and a client 502. The server and the client of various embodiments have functions similar to those of the server and the client shown in FIG. 4, and they will not be repeated here.

In various embodiments, the server 501 can include a determining module 5011 configured to, after receiving an invitation request, determining whether one or more of invited users carried in the invitation request are in a set restricted list; and a sending module 5012 configured to, when determination result of the determining module is no, send the invitation information to clients corresponding to the invited users carried in the invitation request if the microblogging operation is not in high-risk period.

The sending module 5012 can include a determining unit 5013 configured to determine a level of the invitation qualification corresponding to the microblog user who sends the invitation request; and a sending unit 5014 configured to, according to a preset corresponding relation between the level of the invitation qualification and the number of invited users, determine whether the number of the invited users carried in the invitation request is less than or equal to a number of invited users corresponding to the determined level of the invitation qualification, if the determination result is yes, send the invitation information to the clients corresponding to the invited users carried in the invitation request.

The clients corresponding to the above N users who have not registered microblog can include:

clients of N users who have not registered microblog in a network segment; or clients corresponding to a designated microblog user's N friends who have not registered microblog and these friends are obtained through instant communication relation chains of the designated microblog user; or clients of randomly selected N users who have not registered microblog.

The client at least includes at least one of a wireless terminal, a PC client and a web portal.

The invitation information contains at least one of person whom an invited user who receives the invitation information may know, hot user, and hot information;

The client is further configured to display content contained in the invitation information on an invitation information interface for users who receive the invitation information to view.

The system provided in various embodiments has been described in detail.

It can be seen from the above technical solution, the push of the invitation information is controlled by the server and this can realize guiding users who have not registered the microblog to register the microblog. This is completely different from the existing technical solution in which one user actively logins on a microblog site to register microblog. Various embodiments provide convenience for the registration of microblog, and can also improve the registration amount and the influence of the microblog.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An invitation information push method comprising:
   after receiving an invitation request sent by a microblog user, a server sending invitation information to clients corresponding to a number of invited users carried in the invitation request, wherein the invited users are users who have not registered microblog, and the number of the invited users N is greater than or equal to 1; and
   upon receiving the invitation information, each client creating an invitation information guide to guide the user who has not registered microblog to register microblog;
   wherein the server sending the invitation information to the clients corresponding to the invited users comprises:
   determining, by the server, whether one or more of the invited users carried in the invitation request are in a restricted list; and
   if none of the invited users carried in the invitation request is in the restricted list, sending the invitation information to the clients corresponding to the invited users carried in the invitation request if microblogging operation is not in a high-risk period;
   wherein the sending the invitation information to the clients corresponding to the invited users comprises:
   determining a level of an invitation qualification corresponding to the microblog user who sends the invitation request; and
   according to a preset corresponding relation between the level of the invitation qualification and the number of invited users determining whether the number of the invited users carried in the invitation request is less than or equal to the number of invited users corresponding to the determined level of the invitation qualification; if yes, sending the invitation information to the clients corresponding to the invited users carried in the invitation request.

2. The method according to claim 1, wherein the clients corresponding to the N users who have not registered microblog comprise:
   clients of the N users who have not registered microblog in one network segment; or
   clients corresponding to N friends of a designated microblog user, the N friends have not registered microblog and are obtained through instant communication relation chains of the designated microblog user, or,
   clients of randomly selected N users who have not registered microblog.

3. The method according to claim 1, wherein the invitation request sent by the microblog user is sent to the server through following steps:
   when the server receives an invitation triggered by the microblog user, the server judges whether the microblog user has an invitation qualification, if yes, the server provides a microblog invitation interface to a client of the microblog user; and
   the server receives the invitation request sent by the client of the microblog user, wherein the invited users carried in the invitation request are selected by the microblog user from a list of users who have not registered microblog, the list of users is provided in the microblog invitation interface.

4. The method according to claim 1, wherein the clients at least comprises at least one of wireless terminal, PC client and web side.

5. The method according to claim 1, wherein the invitation information contains at least one of hot user, hot information and persons whom the invited users who receive the invitation information may know, and creating an invitation information guide further comprises: displaying content contained in the invitation information on the invitation information guide for users who receive the invitation information to view.

6. The method according to claim 1, wherein the method further comprises:
   when a predetermined time is reached, the server actively sending the invitation information to the clients corresponding to the user who have not registered microblog.

7. An invitation information push system comprising:
   a server comprising a processor for executing modules stored in a non-transitory computer readable storage medium to execute the following procedure:
   after receiving an invitation request sent by a microblog user, send invitation information to clients corresponding to a number of invited users carried in the invitation request; wherein the invited users are users who have not registered microblog, and the number of the invited users N is greater than or equal to 1; and
   upon receiving the invitation information, create an invitation information guide to guide the users who have not registered microblog to register microblog;
   wherein the modules of the server comprise:
   a determining module configured to, after receiving the invitation request, determine whether one or more of the invited users carried in the invitation request are in a restricted list;
   a sending module configured to when a determination result of the determining module is no, send the invitation information to the clients corresponding to the invited users carried in the invitation request if the microblogging operation is not in high-risk period;

wherein the sending module comprises:
a determining unit configured to determine a level of an invitation qualification corresponding to the microblog user who sends the invitation request; and
a sending unit configured to, according to a preset corresponding relation between the level of the invitation qualification and the number of invited users, determine whether the number of the invited users carried in the invitation request is less than or equal to a number of invited users corresponding to the determined level of the invitation qualification; if yes, send the invitation information to the clients corresponding to the invited users carried in the invitation request.

8. The system according to claim 7, wherein the modules of the server are further to execute the following procedure:
when a set time is reached, actively send invitation information to the clients corresponding to the invited users who have not registered microblog.

9. The system according to claim 7, wherein the clients corresponding to the N users who have not registered microblog comprise:
clients of the N users who have not registered microblog in one network segment; or
clients corresponding to N friends of a designated microblog user, the N friends have not registered microblog and are obtained through instant communication relation chains of the designated microblog user, or,
clients of randomly selected N users who have not registered microblog.

10. An invitation information push method comprising:
sending, by a server when a predetermined time is reached, invitation information to at least one client corresponding to at least one user who has not registered microblog;
receiving the invitation information by the at least one client corresponding to the at least one user who has not registered microblog; and
creating, by each of the at least one client, an invitation information guide to guide the at least one user who has not registered microblog to register microblog;
wherein the server sending the invitation information to at least one client corresponding to at least one user who has not registered microblog comprises:
sending, by a microblog user, an invitation request to the server;
determining, by the server, whether one or more of invited users carried in the invitation request are in a restricted list; and
if none of the invited users carried in the invitation request is in the restricted list, sending the invitation information to clients corresponding to the invited users carried in the invitation request;
wherein the sending invitation information to at east one client corresponding to at least one user who has not registered microblog comprises:
sending, by a microblog user, an invitation request to the server;
determining a level of an invitation qualification corresponding to the microblog user who sends the invitation request; and
according to a preset corresponding relation between the level of the invitation qualification and the number of invited users, determining whether the number of the invited users carried in the invitation request is less than or equal to the number of invited users corresponding to the determined level of the invitation qualification; if yes, sending the invitation information to clients corresponding to the invited users carried in the invitation request.

11. The method according to claim 10, wherein the at least one client corresponding to at least one user who has not registered microblog comprises:
a client of the at least one user who has not registered microblog in one network segment; or
clients corresponding to friends of a designated microblog user, the friends have not registered microblog and are obtained through instant communication relation chains of the designated microblog user, or,
clients of randomly selected users who have not registered microblog.

\* \* \* \* \*